Oct. 10, 1967  C. A. TSCHANZ  3,345,885
TRANSMISSION APPARATUS
Filed Feb. 3, 1965  3 Sheets-Sheet 1
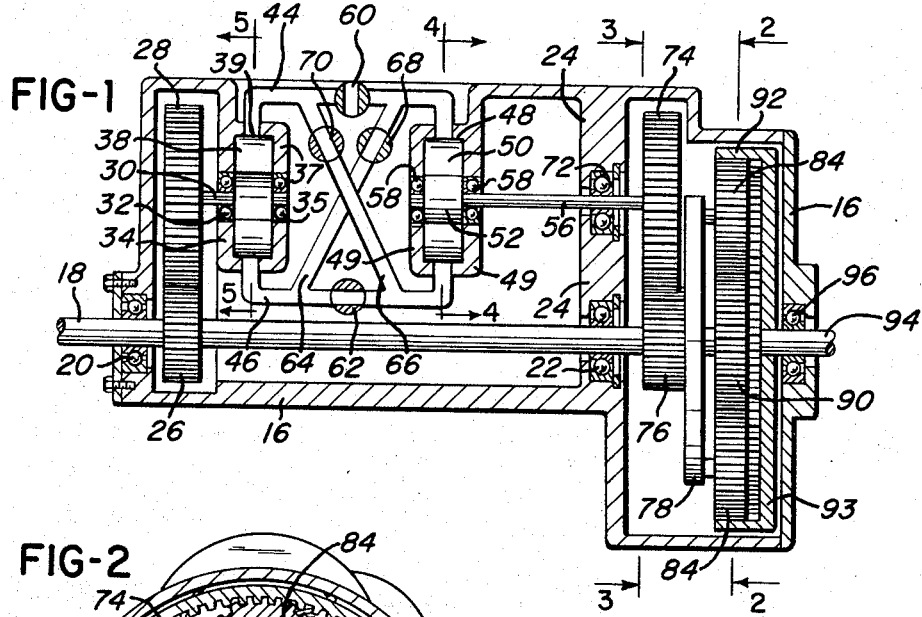
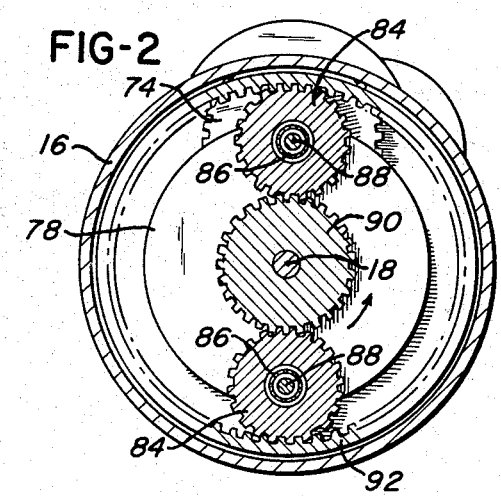
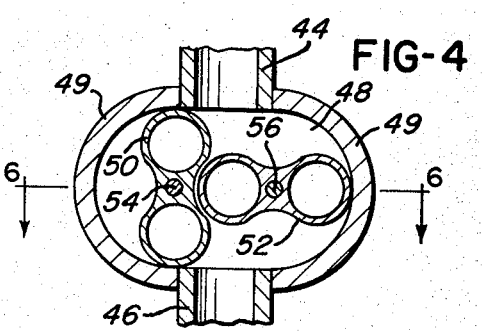
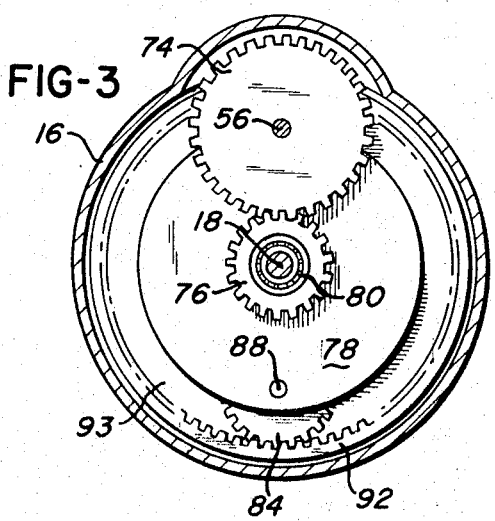
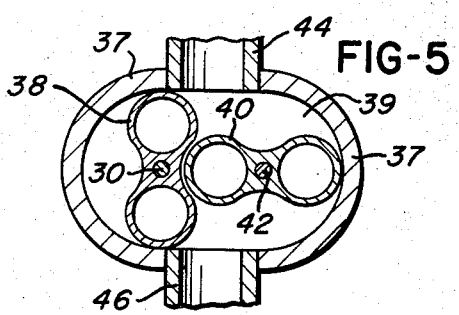
INVENTOR.
CARL A. TSCHANZ
BY *William R Jacox*
ATTORNEY

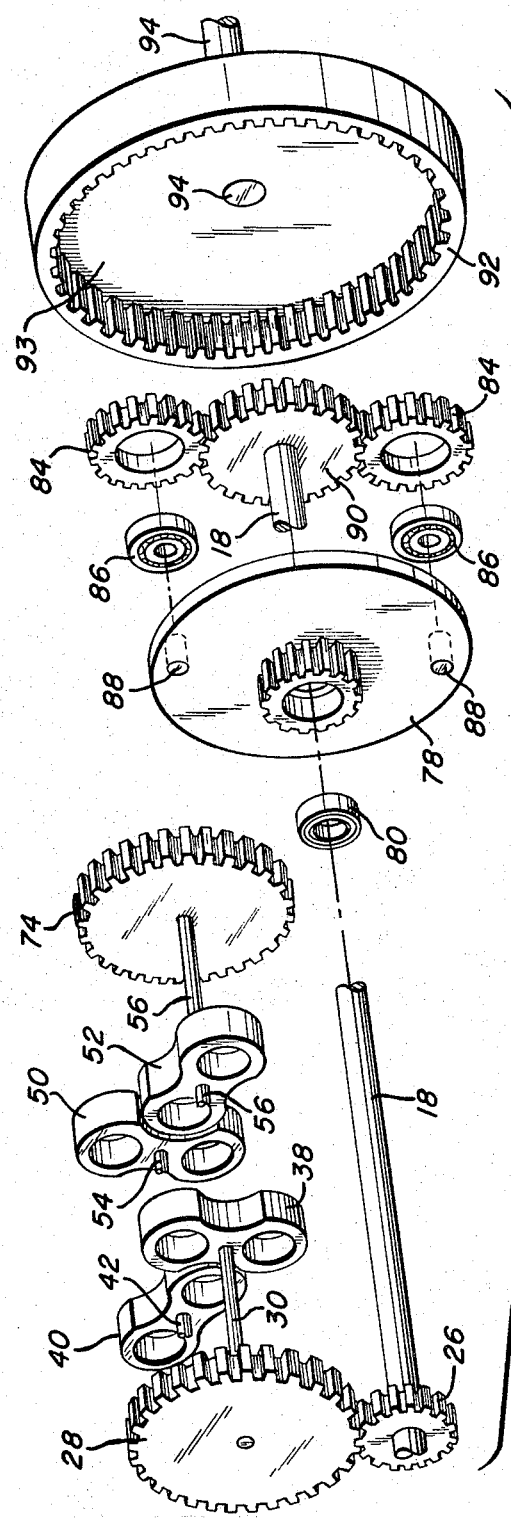
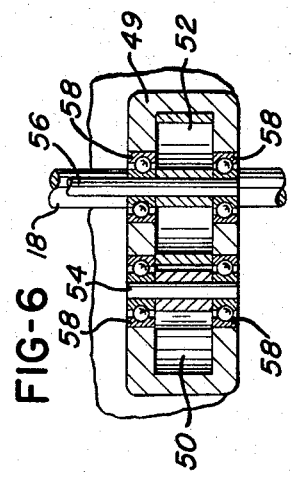

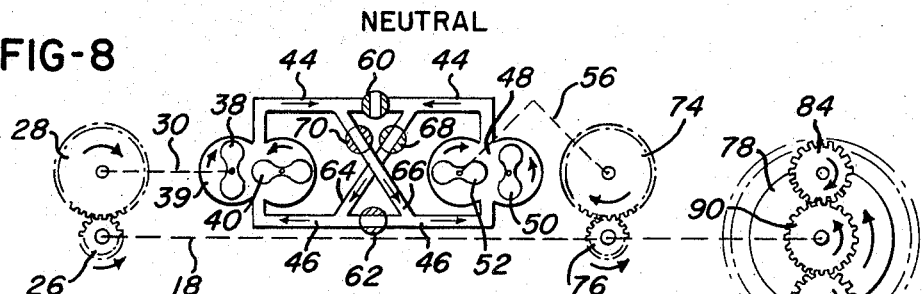
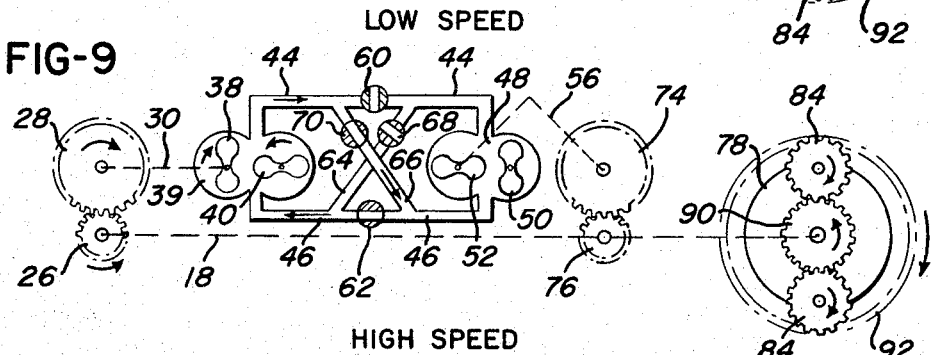
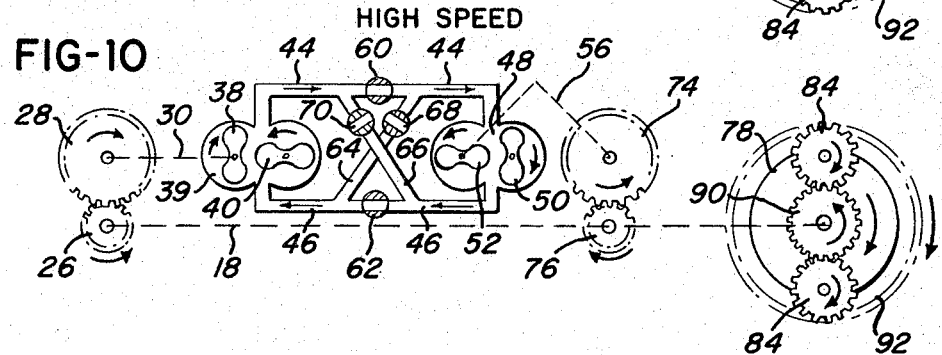
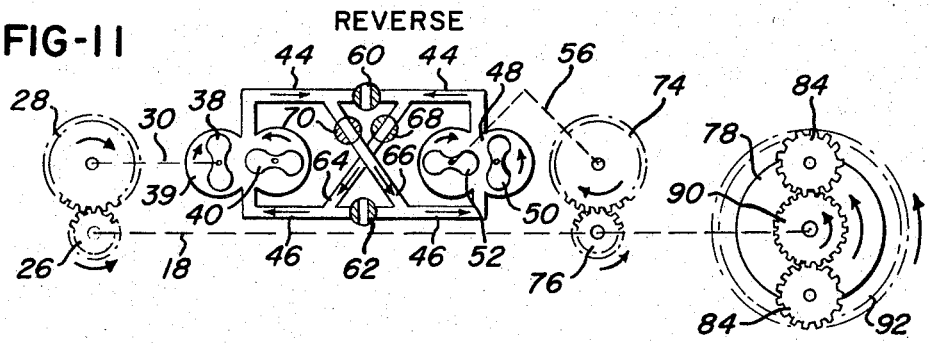

United States Patent Office 3,345,885
Patented Oct. 10, 1967

3,345,885
TRANSMISSION APPARATUS
Carl A. Tschanz, 9954 Springboro Pike,
Miamisburg, Ohio 45342
Filed Feb. 3, 1965, Ser. No. 430,030
3 Claims. (Cl. 74—687)

This invention relates to transmission apparatus. The invention relates more particularly to apparatus for transmission of mechanical energy from one member to another member. The invention relates still more particularly to apparatus for transfer of mechanical energy from one rotative member to another rotative member.

It is an object of this invention to provide transmission apparatus which is capable of operation of a rotative output member at various rates with respect to the rate of rotation of an input member.

Another object of this invention is to provide such apparatus which is capable of smoothly changing relative rates of rotation between a rotative input member and a rotative output member, there being a multiplicty of speed ratios between a minimum and a maximum.

Another object of this invention is to provide such apparatus which is capable of providing a high ratio between the rate of rotation of a driving member and the rate of rotation of a driven member.

Another object of this invention is to provide such apparatus which is capable of smooth reversal of rotation of a driven member with respect to rotation of a driving member.

Another object of this invention is to provide such apparatus which has simplicity and relatively low costs in construction and which is long-lived.

Other objects and advantages reside in the construction of parts, the combination thereof, the method of manufacture, and the mode of operation, as will become more apparent from the following description.

In the drawings:

FIGURE 1 is a longitudinal sectional view of transmission apparatus of this invention.

FIGURE 2 is a sectional view taken substantially on line 2—2 of FIGURE 1.

FIGURE 3 is a sectional view taken substantially on line 3—3 of FIGURE 1.

FIGURE 4 is an enlarged sectional view taken substantially on line 4—4 of FIGURE 1.

FIGURE 5 is an enlarged sectional view taken substantially on line 5—5 of FIGURE 1.

FIGURE 6 is a sectional view taken substantially on line 6—6 of FIGURE 4.

FIGURE 7 is an exploded perspective view of the movable elements of the apparatus shown in FIGURE 1.

FIGURES 8, 9, 10, and 11 are diagrammatic views illustrating operation of transmission apparatus of this invention. The elements of the apparatus are shown as they appear when viewed from the right hand end of FIGURE 1.

Referring to the drawings in detail, transmission apparatus of this invention is shown herein as comprising a housing 16. A shaft 18 extends into the housing 16 and is journalled in any suitable bearing members 20 and 22. The bearing member 20 is carried by the housing 16 and the bearing 22 is carried by a support member or support wall 24 within the housing 16.

The shaft 18 has a gear 26 attached thereto for rotation therewith. The gear 26 is adjacent the bearing 20 and is in meshed relationship with a gear 28, the gear 28 being supported by a shaft 30, which is spaced from the shaft 18. The shaft 30 is journalled in a bearing 32 which is carried by a wall 34 and by a bearing 35 which is carried by a wall 37 within the housing 16, as shown in FIGURE 1. The walls 34 and 37 form a chamber 39.

The shaft 30 supports a rotor or impeller 38 within the chamber 39. The impeller 38 is in meshed relationship with a rotor or impeller 40 within the chamber 39. The impeller 40 is supported by a shaft 42. The impellers 38 and 40 within the chamber 39 serve as fluid pump means.

The chamber 39 has a conduit 44 and a conduit 46 in communication therewith. The conduits 44 and 46 extend from the chamber 39 to a chamber 48 and are in communication therewith. The chamber 48 is formed by wall members 49.

Within the chamber 48 are a rotor 50 and a rotor 52 which are in meshed relationship one with the other. The rotor 50 and 52 serve as fluid motor means. The rotor 50 is carried by a shaft 54 and the rotor 52 is carried by a shaft 56. The shafts 54 and 56 rotate in suitable bearing members 58, shown in FIGURES 1 and 6, which are supported by the wall members 49.

Within the conduit 44, intermediate the chamber 39 and the chamber 48, is a valve 60. Within the conduit 46, intermediate the chamber 39 and the chamber 48, is a valve 62. Fluid conductor members 64 and 66 join the conduit 44 to the conduit 46. Within the fluid conductor 64 is a valve 68 and within the fluid conductor 66 is a valve 70.

The shaft 56, which supports the rotor 52, extends from the chamber 48, through the support wall 24, and rotates in a bearing 72 which is carried by the wall 24. The shaft 56 has a gear 74 attached thereto for rotation therewith. The gear 74 is in meshed relationship with a gear 76 which is secured to a support member or support plate 78, for rotation therewith. The gear 76 and the plate 78 are rotatably supported upon the shaft 18 by a bearing 80, shown in FIGURES 3 and 7.

The plate 78 is shown as rotatably supporting a plurality of planetary gears 84. However, a single planetary gear 84 may be employed. Each of the planetary gears 84 is supported by a bearing 86 which is mounted upon a pin 88 which is carried by the plate 78. The planetary gears 84 are in meshed relationship with a sun gear 90 which is attached to the shaft 18 for rotation therewith. The planetary gears 84 are also in meshed relationship with an annular gear 92. The annular gear 92 has a back wall 93 which is attached to a shaft 94 for rotation therewith. The shaft 94 is journalled in a bearing 96 which is carried by the housing 16, as shown in FIGURE 1.

OPERATION

The shaft 18 is adapted to be an input shaft and is attached to any suitable drive means for rotation thereof. The shaft 94 is adapted to be an output shaft for connection of a load thereto. The shaft 18 may be rotated at a constant rate, if desired, or the shaft 18 may be rotated at rates other than constant. For purposes of illustration, it is assumed that the shaft 18 is rotating clockwise, as viewed in FIGURE 2.

As the shaft 18 is rotated, the gear 26 which is attached thereto is rotated. Thus, the gear 28 which is meshed with the gear 26 is also rotated. Rotation of the gear 28 causes rotation of the shaft 30 so that the impeller or rotor 38 is also rotated. Rotation of the rotor 38 causes rotation of the rotor 40, as the rotors 38 and 40 rotate one with the other.

The chambers 39 and 48 and the conduits 44 and 46 and the fluid conductors 64 and 66 contain a suitable fluid, which may be an oil or the like. Thus, the impellers 38 and 40 cause fluid to be pumped from the chamber 39.

Since it is assumed that the shaft 18 is rotating counterclockwise as viewed in FIGURE 2, the impellers or rotors 38 and 40 rotate to force fluid from the chamber 39 into the conduit 44, as illustrated by arrows in FIGURES 8, 9, 10, and 11. However, after the fluid enters the conduit 44, the path or paths of flow of fluid are determined by the positions of the valves 60, 62, 68, and 70.

By selecting the desired relative positions of the valves 60, 62, 68, and 70, various relative rates of rotation of the output shaft 94 with respect to the input shaft 18 may be obtained.

FIGURE 8 illustrates neutral operation of the output shaft 94. During neutral operation there is rotation of the input shaft 18, but there is no rotative movement of the output shaft 94.

As shown in FIGURE 8, during neutral operation, the valve 60 is closed, and the valves 62, 68, and 70 are open. Therefore, as fluid is forced from the chamber 39 into the conduit 44, the fluid flows from the conduit 44 into the conductor 66. Then due to the fact that the valve 62 is open, fluid may flow from the conductor 66 within the conduit 46 in either direction. Furthermore, due to the fact that the valve 68 is open, fluid flows freely within the fluid conductor 64. Thus, no fluid pressure is established in the chamber 48 for rotation of the rotors 50 and 52.

Thus, the rotors 50 and 52 are freely rotatable and the rotors 50 and 52 may be driven by the shaft 56. As stated above, the shaft 18 is rotating in a counterclockwise direction as viewed in FIGURE 2. Therefore, if the output shaft 94 is loaded or braked, the planetary gears 84 rotate freely within the annular gear 92 as the planetary gears 84 are rotated by rotation of the sun gear 90. The support plate 78 is rotated by the planetary gears 84. Rotation of the support plate 78 causes rotation of the rotors 50 and 52, as the rotors 50 and 52 freely rotate. The annular gear 92 does not rotate. Thus, the output shaft 94 does not rotate and the apparatus operates in "neutral."

FIGURE 9 illustrates operation of the output shaft 94 at a low rate of rotation.

As a general statement, slow forward operation of the output shaft 94 is obtained when the support 78 is stationary or when the rate of rotation of the support plate 78 is less than the rate of rotation of the sun gear 90 in the direction of rotation of the sun gear 90.

As shown in FIGURE 9, the valves 70 and 62 are open and the valves 60 and 68 are closed. Therefore, as the input shaft 18 rotates, fluid is pumped by the rotors 38 and 40 from the chamber 39 into the conduit 44, then through the fluid conductor 66, into the conduit 46, and then into the chamber 48. However, due to the fact that the valves 60 and 68 are closed, the fluid cannot flow through the chamber 48. Thus, the fluid in the chamber 48 is static and the rotors 50 and 52 in the chamber 48 are held against rotation by pressure of fluid within the chamber 48. Thus, there is no rotation of the gear 74 and there is no rotation of the gear 76. Therefore, the support plate 78 does not rotate.

However, due to the fact that the shaft 18 is rotating, the sun gear 90 is rotating. Thus, the planetary gears 84 are rotated by the sun gear 90 as the support plate 78 remains stationary. Thus, the planetary gears 84 cause rotation of the annular gear 92 which is in meshed relationship therewith. Rotation of the annular gear 92 causes rotation of the output shaft 94. Thus, the rate of rotation of the output shaft 94 is considerably less than the rate of rotation of the input shaft 18.

If it is desired to obtain a lower rate of rotation of the output shaft 94, the valve 62 is closed slightly, while the valve 68 is opened slightly. Under such conditions, the rotors 50 and 52 rotate slowly, the rotor 52 rotating clockwise. Thus, the support plate 78 rotates counterclockwise at a low rate. Therefore, the annular gear 92 and the output shaft 94 rotate at a low rate in a clockwise direction.

FIGURE 10 illustrates operation of the output shaft 94 at a high rate. The valves 60 and 62 are open and the valves 68 and 70 are closed. Therefore, fluid pumped from the chamber 39 by rotation of the impellers or rotors 38 and 40 flows through the entire conduit 44 and into the chamber 48 and outwardly from the chamber 48 through the entire conduit 46 to return to the chamber 39. As the fluid flows through the chamber 48 the rotors 50 and 52 are rotated. The rotor 52 rotates counterclockwise as shown in FIGURE 10. Thus, the shaft 56 and the gear 74 rotate counterclockwise and the gear 76 rotates clockwise, causing the support plate 78 to rotate clockwise. Rotation of the support plate 78 carries therewith the planetary gears 84.

Due to the fact that the input shaft 18 is rotating counterclockwise, the sun gear 90 is rotated counterclockwise. Thus, as the planetary gears 84 are in meshed relationship with the sun gear 90, the planetary gears 84 are rotated clockwise by the sun gear 90.

Thus, the rate of rotation of the planetary gears 84 is relatively high with respect to the rate of rotation of the input shaft 18. Thus, the planetary gears 84 rotate the annular gear 92 at a relatively high rate and the output shaft 94, attached to the annular gear 92, rotates at a relatively high rate.

A wide variation in rate of rotation of the output shaft 94 may be obtained by adjusting the valves 60 and 62 to permit greater or lesser flow of fluid therethrough, thus controlling the rate of rotation of the rotors 50 and 52. As the valve 62 is adjustably closed, the valve 68 is adjustably opened to avoid creation of excessively high pressures in the chamber 48 during speed control operation of the rotors 50 and 52.

FIGURE 11 illustrates reverse operation of the output shaft 94 of the apparatus. As a general statement, reverse operation of the output shaft 94 is obtained when the rate of rotation of the support plate 78 is equal to or greater than the rate of rotation of the sun gear 90, as the support plate 78 rotates in the same direction as the sun gear 90. As shown in FIGURE 11, the valves 60 and 62 are in closed position; the valves 68 and 70 are in open position. Therefore, as fluid is pumped from the chamber 39 into the conduit 44, the fluid flows through the fluid conductor 66 and into the conduit 46 and then into the chamber 48. Thus, the rotors 50 and 52 are rotated. The fluid flows from the chamber 48 into the conduit 44 and then into the conductor 64 and then returns to the chamber 39 through the conduit 46.

During such conditions, the rotor 52 rotates clockwise, the gear 74 rotates clockwise, and the gear 76 rotates counterclockwise. Therefore, the support plate 78 rotates counterclockwise and the sun gear 90 is rotating counterclockwise. If the rate of rotation of the support plate 78 is equal to the rate of rotation of the sun gear 90, there is no relative rotative movement of the planetary gears 84 with respect to the sun gear 90. Under such conditions, the annular gear 92 and the output shaft 94 are rotated counterclockwise, or in a reverse direction, at the rate of rotation of the support plate 78.

Other rates of reverse rotation are obtainable by adjustment of the valve 68 which controls the rate of rotation of the rotors 50 and 52 and thus controls the rate of rotation of the support plate 78. Preferably, as the valve 68 is adjustably closed, the valve 62 is adjustably opened to maintain fluid pressure within the chamber 48 substantially constant while changing the volume of fluid flow therethrough. By such adjustment, the rate of rotation of the rotors 50 and 52 is changed, and thus the rate of rotation of the support plate 78 is changed. As stated above, during reverse rotation of the output shaft 94, the rate of rotation of the support plate 78 is equal to or greater than the rate of rotation of the sun gear 90 in the direction of rotation of the sun gear 90. Thus, various rates of reverse rotation of the output shaft 94 with respect to the input shaft 18 are obtained.

It is to be understood that within the purview of this invention, types of fluid apparatus other than the rotors 38, 40, 50, and 52 may be employed for rotation of the support plate 78. Also, types of apparatus other than fluid apparatus may be employed for this purpose.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

The invention having thus been described, the following is claimed:

1. Transmission apparatus comprising:
a first rotary shaft,
a second rotary shaft,
rotary fluid pump means,
means connecting the first rotary shaft to the rotary fluid pump means for rotary operation of the rotary fluid pump means at a constant rate with respect to the rate of rotation of the first rotary shaft,
rotary fluid motor means,
conduit means connecting the rotary fluid pump means to the rotary fluid motor means for operation of the rotary fluid motor means with operation of the rotary fluid pump means, the conduit means including direct connecting conduit means between the rotary fluid pump means and the rotary fluid motor means and independently operable valve means therein for adjusting the rate of operation of the rotary fluid motor means in the forward direction of rotation with respect to the direction of rotation of the rotary fluid pump means, the conduit means also including interconnecting conduit means between the direct connecting conduit means and independently adjustable valve means therein for adjusting the rate of operation of the rotary fluid motor means in the reverse direction of rotation with respect to the direction of rotation of the rotary fluid pump means,
first gear means, the first gear means being operably connected to the first rotary shaft for rotation therewith,
gear support means rotatably disposed adjacent the first gear means,
means connecting the rotary fluid motor means to the gear support means for rotation thereof,
second gear means carried by the gear support means and in meshed relationship with the first gear means,
annular gear means operably connected to the second rotary shaft for rotation therewith,
the second gear means being in meshed relationship with the annular gear means, the second rotary shaft thus being operable in either direction of rotative movement at an infinite number of rates between zero speed and maximum speed.

2. Transmission apparatus comprising:
a first rotary shaft;
a second rotary shaft,
rotary fluid pump means, the pump means having constant volume output for a given rate of rotary operation,
means connecting the first rotary shaft to the rotary fluid pump means for rotation at a constant rate with respect to the rate of rotation of the first rotary shaft,
rotary fluid motor means,
conduit means including valve means connecting the fluid pump means to the fluid motor means, the conduit means including means for adjusting the rate of operation of the rotary motor means in the forward direction and in the reverse direction with respect to the direction of rotation of the rotary fluid pump means, the conduit means also including first fluid lines directly joining the fluid pump means to the fluid motor means and also including interconnecting fluid lines joined to the first fluid lines for communication therebetween,
control means within the conduit means for controlling flow of fluid between the fluid pump means and the fluid motor means, the control means including independently adjustable valve means within the first fluid lines and independently adjustable valve means within the interconnecting fluid lines,
sun gear means, the sun gear means being operably connected to the first rotary shaft for rotation therewith,
gear support means rotatably disposed adjacent the sun gear means,
means connecting the fluid motor means to the gear support means for rotation thereof,
second gear means carried by the gear support means and in meshed relationship with the sun gear means,
annular gear means operably connected to the second rotary shaft for rotation therewith,
the second gear means also being in meshed relationship with the annular gear means.

3. Transmission apparatus comprising:
a rotary input shaft,
a rotary output shaft,
a rotary fluid pump,
a rotary fluid motor,
gear means operably connecting the rotary input shaft to the rotary fluid pump for rotary operation thereof at a constant rate with respect to the rate of rotation of the rotary input shaft,
conduit means connecting the fluid pump to the fluid motor for operation of the fluid motor with operation of the fluid pump, the conduit means including independently operable valve means for operation of the rotary fluid motor in the forward direction and independently operable valve means for operation of the fluid motor in the reverse direction with respect to the direction of rotation of the rotary fluid pump,
a sun gear attached to the rotary input shaft for rotation therewith,
a support member carried upon the rotary input shaft and rotatable with respect thereto, the support member being disposed adjacent the sun gear,
a planetary gear rotatably supported by the support member and in meshed relationship with the sun gear,
connector means operably connecting the support member to the fluid motor for rotation thereby,
an annular gear attached to the rotary output shaft for rotation therewith,
the planetary gear and the annular gear being in meshed relationship one with the other.

References Cited
UNITED STATES PATENTS

| | | | |
|---|---|---|---|
| 1,197,789 | 9/1916 | Bluemel | 74—687 |
| 2,002,709 | 5/1935 | Niderhauser | 60—53 X |
| 2,054,802 | 9/1936 | Bronander. | |
| 2,390,240 | 12/1945 | De Lancey | 60—53 X |

(Other references on following page)

UNITED STATES PATENTS

| | | | |
|---|---|---|---|
| 2,556,378 | 6/1951 | Sisson | 60—53 X |
| 2,591,363 | 4/1952 | Kraft et al. | 74—687 |
| 2,599,814 | 6/1952 | Cull | 74—687 |
| 2,774,255 | 12/1956 | Morris | 74—687 |
| 2,928,295 | 3/1960 | Boulanger | 60—53 X |

FOREIGN PATENTS

| | | |
|---|---|---|
| 770,566 | 7/1934 | France. |
| 884,337 | 8/1943 | France. |
| 1,078,399 | 3/1960 | Germany. |
| 450,488 | 7/1936 | Great Britain. |
| 587,692 | 5/1947 | Great Britain. |
| 747,196 | 3/1956 | Great Britain. |

OTHER REFERENCES

Popular Science, vol. 164, 155. 4, p. 146, April 1954.

DONLEY J. STOCKING, *Primary Examiner.*

DAVID J. WILLIAMOWSKY, *Examiner.*

J. R. BENEFIEL, *Assistant Examiner.*